US011441021B2

(12) United States Patent
Steiner et al.

(10) Patent No.: US 11,441,021 B2
(45) Date of Patent: *Sep. 13, 2022

(54) PNEUMATIC TIRE

(71) Applicant: The Goodyear Tire & Rubber Company, Akron, OH (US)

(72) Inventors: Pascal Patrick Steiner, Vichten (LU); Georges Marcel Victor Thielen, Schouweiler (LU); Marc Weydert, Bertrange (LU); Benoit Duez, Mamer (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/925,521

(22) Filed: Jul. 10, 2020

(65) Prior Publication Data
US 2021/0032443 A1 Feb. 4, 2021

Related U.S. Application Data

(63) Continuation-in-part of application No. 16/524,284, filed on Jul. 29, 2019, now Pat. No. 11,214,667.

(51) Int. Cl.
*C08L 9/06* (2006.01)
*C08K 3/36* (2006.01)
*C08F 212/08* (2006.01)
*B60C 1/00* (2006.01)
*C08F 293/00* (2006.01)
*C08G 77/26* (2006.01)
*C08G 77/28* (2006.01)
*C08F 132/08* (2006.01)

(52) U.S. Cl.
CPC .............. *C08L 9/06* (2013.01); *B60C 1/0016* (2013.01); *C08F 132/08* (2013.01); *C08F 212/08* (2013.01); *C08F 293/005* (2013.01); *C08G 77/26* (2013.01); *C08G 77/28* (2013.01); *C08K 3/36* (2013.01)

(58) Field of Classification Search
None
See application file for complete search history.

(56) References Cited

U.S. PATENT DOCUMENTS

| | | | |
|---|---|---|---|
| 4,704,414 A | 11/1987 | Kerner et al. | |
| 6,123,762 A | 9/2000 | Barthel et al. | |
| 6,573,324 B1 | 6/2003 | Cohen et al. | |
| 6,608,125 B2* | 8/2003 | Cruse | C08L 21/00 524/262 |
| 7,119,147 B2 | 10/2006 | Kikuchi | |
| 7,214,731 B2 | 5/2007 | Zanzig et al. | |
| 7,432,318 B2 | 10/2008 | Kikuchi | |
| 7,671,132 B1 | 3/2010 | Thielen et al. | |
| 7,789,117 B2* | 9/2010 | Puhala | B60C 11/14 152/209.4 |
| 7,946,323 B2 | 5/2011 | Kikuchi et al. | |
| 8,312,905 B2 | 11/2012 | Steiner et al. | |
| 8,450,424 B2* | 5/2013 | Koelle | B60C 1/0016 525/192 |
| 8,592,515 B2* | 11/2013 | Francik | C08K 3/36 524/526 |
| 9,090,730 B1 | 7/2015 | Mazumdar et al. | |
| 9,109,073 B1 | 8/2015 | Ma et al. | |
| 9,109,103 B2 | 8/2015 | Ma et al. | |
| 9,416,259 B2 | 8/2016 | Mathey et al. | |
| 9,441,098 B1 | 9/2016 | Isitman et al. | |
| 9,856,368 B2* | 1/2018 | Herzog | B60C 1/0016 |
| 9,873,780 B1 | 1/2018 | Sandstrom | |
| 10,160,847 B2 | 12/2018 | Lesage et al. | |
| 10,273,351 B2* | 4/2019 | Pavon Sierra | C08L 9/00 |
| 10,427,463 B2* | 10/2019 | Schweitzer | C08L 9/06 |
| 2003/0130535 A1 | 7/2003 | Deschler et al. | |
| 2006/0021688 A1* | 2/2006 | Sandstrom | C08L 21/00 152/209.4 |
| 2007/0175557 A1* | 8/2007 | Puhala | B60C 11/0058 152/209.5 |
| 2007/0221303 A1* | 9/2007 | Sandstrom | C08K 7/06 152/209.5 |
| 2009/0186965 A1 | 7/2009 | Rodgers et al. | |
| 2010/0249270 A1* | 9/2010 | Robert | C08K 3/013 523/150 |

(Continued)

FOREIGN PATENT DOCUMENTS

EP 2748014 B1 7/2016
EP 2225323 B1 3/2017

(Continued)

OTHER PUBLICATIONS

European Search Report for Serial No. EP20187906 dated Jan. 22, 2021.
JSR Corporation, Products, Assets, Oct. 2019, 1-2, JSR Corporation, JP.
SHA Saito, SBR, 1998, 315-323, vol. 71, No. 6, Journal of the Society of Rubber Science and Technology, JP.
Yoshihiro Sakurai, The Effect and Application of Tackifiers, The Effect and Application of Tackifiers, 2014, 59-64, vol. 50, No. 2, Journal of the Adhesion Society of Japan, JP.

(Continued)

Primary Examiner — Peter A Salamon
(74) Attorney, Agent, or Firm — Mandy B. Willis

(57) ABSTRACT

The present invention is directed to a pneumatic tire having a tread comprising a vulcanizable rubber composition comprising, based on 100 parts by weight of elastomer (phr), (A) 100 phr of a solution polymerized styrene-butadiene rubber having a glass transition temperature (Tg) ranging from −85° C. to −50° C.;
(B) from 1 to 30 phr of a process oil;
(C) from 20 to 80 phr of a hydrocarbon resin having a Tg of at least 30° C.; and
(D) from 90 to 150 phr of silica.

17 Claims, No Drawings

(56) References Cited

U.S. PATENT DOCUMENTS

| | | | |
|---|---|---|---|
| 2012/0289647 A1* | 11/2012 | Koelle | B29B 7/7495 |
| | | | 524/525 |
| 2013/0267640 A1 | 10/2013 | Lopez et al. | |
| 2013/0274404 A1 | 10/2013 | Vasseur et al. | |
| 2013/0296471 A1 | 11/2013 | Lesage et al. | |
| 2014/0069560 A1* | 3/2014 | Schweitzer | B60C 1/0016 |
| | | | 152/209.1 |
| 2014/0371346 A1 | 12/2014 | Saintigny et al. | |
| 2015/0031792 A1 | 1/2015 | Dunlavy | |
| 2015/0065655 A1 | 3/2015 | Blok et al. | |
| 2016/0159147 A1 | 6/2016 | Isitman et al. | |
| 2016/0159157 A1 | 6/2016 | Jacoby et al. | |
| 2016/0200141 A1* | 7/2016 | Herzog | C08L 9/00 |
| | | | 523/156 |
| 2016/0376427 A1 | 12/2016 | Sandstrom et al. | |
| 2016/0376428 A1 | 12/2016 | Sandstrom et al. | |
| 2017/0037225 A1 | 2/2017 | Isitman et al. | |
| 2017/0051135 A1 | 2/2017 | Sandstrom et al. | |
| 2017/0114212 A1 | 4/2017 | Pompei et al. | |
| 2017/0145195 A1 | 5/2017 | Isitman et al. | |
| 2017/0166732 A1 | 6/2017 | Isitman et al. | |
| 2017/0198122 A1 | 7/2017 | Rodgers et al. | |
| 2017/0204256 A1 | 7/2017 | Labrunie et al. | |
| 2017/0204257 A1 | 7/2017 | Labrunie et al. | |
| 2017/0232795 A1 | 8/2017 | Isitman et al. | |
| 2017/0334244 A1 | 11/2017 | Isitman et al. | |
| 2017/0349733 A1 | 12/2017 | Isitman et al. | |
| 2018/0037059 A1* | 2/2018 | Hamann | C08F 36/00 |
| 2018/0100058 A1* | 4/2018 | Pavon Sierra | C08K 3/36 |
| 2018/0134086 A1 | 5/2018 | Schweitzer et al. | |
| 2018/0154696 A1 | 6/2018 | Isitman et al. | |
| 2018/0186978 A1 | 7/2018 | Abad | |
| 2019/0002653 A1 | 1/2019 | Stubblefield et al. | |
| 2019/0062529 A1 | 2/2019 | Isitman et al. | |
| 2019/0062532 A1 | 2/2019 | Isitman et al. | |
| 2019/0062533 A1 | 2/2019 | Isitman et al. | |

FOREIGN PATENT DOCUMENTS

| | | |
|---|---|---|
| JP | 2018135461 A | 8/2018 |
| JP | 2018177873 A | 11/2018 |
| JP | 2019112599 A | 7/2019 |
| WO | 2012069565 A1 | 5/2012 |
| WO | 2012069567 A1 | 5/2012 |
| WO | 2013040425 A1 | 3/2013 |
| WO | 2018079800 A1 | 5/2018 |
| WO | 2018181373 A1 | 10/2018 |

OTHER PUBLICATIONS

Observation by a Third Party for European Serial No. 20187906.1 dated Dec. 8, 2021.

English translation of Korean Notice of Allowance for Serial No. 2020-0093553 dated Feb. 21, 2022, JP2011508815A not included.

* cited by examiner

PNEUMATIC TIRE

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads.

Tires are sometimes desired with treads for promoting chipping and flaking resistance. Various rubber compositions may be proposed for tire treads. Here, the challenge is to improve the tread tensile strength property while maintaining a low hysteresis for reduced rolling resistance.

SUMMARY OF THE INVENTION

The present invention is directed to a pneumatic tire having a tread comprising a vulcanizable rubber composition comprising, based on 100 parts by weight of elastomer (phr),
(A) 100 phr of a solution polymerized styrene-butadiene rubber having a glass transition temperature (Tg) ranging from −85° C. to −50° C.;
(B) from 1 to 30 phr of a process oil;
(C) from 20 to 80 phr of a hydrocarbon resin having a Tg of at least 30° C.; and
(D) from 90 to 150 phr of silica.

The invention is further directed to a method of making a tire.

DESCRIPTION OF THE INVENTION

There is disclosed a pneumatic tire having a tread comprising a vulcanizable rubber composition comprising, based on 100 parts by weight of elastomer (phr),
(A) 100 phr of a solution polymerized styrene-butadiene rubber having a glass transition temperature (Tg) ranging from −85° C. to −50° C.;
(B) from 1 to 30 phr of a process oil;
(C) from 20 to 80 phr of a hydrocarbon resin having a Tg of at least 30° C.; and
(D) from 90 to 150 phr of silica.

There is further disclosed a method of making a tire.

The rubber composition includes from 20 to 100 phr, alternatively 70 to 90 phr, alternatively 100 phr, of a styrene-butadiene rubber having a glass transition temperature (Tg) ranging from −85° C. to −50° C. The styrene-butadiene rubber may be functionalized with various functional groups, or the styrene-butadiene rubber may be non-functionalized. In on embodiment the styrene-butadiene rubber is functionalized with an alkoxysilane group and at least one of a primary amine group and thiol group. In one embodiment, the styrene-butadiene rubber is obtained by copolymerizing styrene and butadiene, and characterized in that the styrene-butadiene rubber has a primary amino group and/or thiol group and an alkoxysilyl group which are bonded to the polymer chain. In one embodiment, the alkoxysilyl group is an ethoxysilyl group. In one embodiment, the styrene-butadiene rubber is not functionalized.

The primary amino group and/or thiol group may be bonded to any of a polymerization initiating terminal, a polymerization terminating terminal, a main chain of the styrene-butadiene rubber and a side chain, as long as it is bonded to the styrene-butadiene rubber chain. However, the primary amino group and/or thiol group is preferably introduced to the polymerization initiating terminal or the polymerization terminating terminal, in that the disappearance of energy at a polymer terminal is inhibited to improve hysteresis loss characteristics.

Further, the content of the alkoxysilyl group bonded to the polymer chain of the (co)polymer rubber is preferably from 0.5 to 200 mmol/kg of styrene-butadiene rubber. The content is more preferably from 1 to 100 mmol/kg of styrene-butadiene rubber, and particularly preferably from 2 to 50 mmol/kg of styrene-butadiene rubber.

The alkoxysilyl group may be bonded to any of the polymerization initiating terminal, the polymerization terminating terminal, the main chain of the (co)polymer and the side chain, as long as it is bonded to the (co)polymer chain. However, the alkoxysilyl group is preferably introduced to the polymerization initiating terminal or the polymerization terminating terminal, in that the disappearance of energy is inhibited from the (co)polymer terminal to be able to improve hysteresis loss characteristics.

The styrene-butadiene rubber can be produced by polymerizing styrene and butadiene in a hydrocarbon solvent by anionic polymerization using an organic alkali metal and/or an organic alkali earth metal as an initiator, adding a terminating agent compound having a primary amino group protected with a protective group and/or a thiol group protected with a protecting group and an alkoxysilyl group to react it with a living polymer chain terminal at the time when the polymerization has substantially completed, and then conducting deblocking, for example, by hydrolysis or other appropriate procedure. In one embodiment, the styrene-butadiene rubber can be produced as disclosed in U.S. Pat. No. 7,342,070. In another embodiment, the styrene-butadiene rubber can be produced as disclosed in WO 2007/047943.

In one embodiment, and as taught in U.S. Pat. No. 7,342,070, the styrene-butadiene rubber is of the formula (I) or (II)

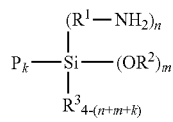

wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

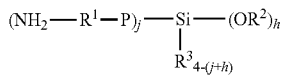   II wherein P, $R^1$, $R^2$ and $R^3$ have the same definitions as give for the above-mentioned formula I, j is an integer of 1 to 3, and h is an integer of 1 to 3, with the provision that j+h is an integer of 2 to 4.

The terminating agent compound having a protected primary amino group and an alkoxysilyl group may be any of various compounds as are known in the art. In one embodiment, the compound having a protected primary amino group and an alkoxysilyl group may include, for example, N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)-aminoethyltriethoxysilne, N,N-bis(trimethylsilyl)aminoethylmethyldimethoxysilane, N,N-bis(trimethylsilyl)aminoethylmethyldiethoxysilane, etc., and preferred are 1-trimethylsilyl-2,2-dimethoxy-1-aza-2-silacyclopentane, N,N-bis(trimethylsilyl) aminopropylmethyldimethoxysilane and N,N-bis(trimethylsilyl)aminopropylmethyldiethoxysilane. In one embodiment, the compound having a protected primary amino group and an alkoxysilyl group is N,N-bis(trimethylsilyl)aminopropyltriethoxysilane.

In one embodiment, the compound having a protected primary amino group and an alkoxysilyl group may be any compound of formula III $$RN-(CH_2)_xSi(OR')_3, \quad III$$

wherein R in combination with the nitrogen (N) atom is a protected amine group which upon appropriate post-treatment yields a primary amine, R' represents a group having 1 to 18 carbon atoms selected from an alkyl, a cycloalkyl, an allyl, or an aryl; and X is an integer from 1 to 20. In one embodiment, at least one R' group is an ethyl radical. By appropriate post-treatment to yield a primary amine, it is meant that subsequent to reaction of the living polymer with the compound having a protected primary amino group and an alkoxysilyl group, the protecting groups are removed. For example, in the case of bis(trialkylsilyl) protecting group as in N,N-bis(trimethylsilyl)aminopropyltriethoxysilane, hydrolysis is used to remove the trialkylsilyl groups and leave the primary amine.

In one embodiment, the rubber composition includes from about 40 to about 60 phr of styrene-butadiene rubber functionalized with an alkoxysilane group and a primary amine group or thiol group.

Suitable styrene-butadiene rubbers functionalized with an alkoxysilane group and a primary amine group are available commercially, such as HPR 340 from Japan Synthetic Rubber (JSR).

In one embodiment, the solution polymerized styrene-butadiene rubber is as disclosed in WO 2007/047943 and is functionalized with an alkoxysilane group and a thiol, and comprises the reaction product of a living anionic polymer and a silane-sulfide modifier represented by the formula IV

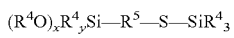   IV wherein Si is silicon; S is sulfur; O is oxygen; x is an integer selected from 1, 2 and 3; y is an integer selected from 0, 1, and 2; x+y=3; $R^4$ is the same or different and is $(C_1-C_{16})$ alkyl; and R' is aryl, and alkyl aryl, or $(C_1-C_{16})$ alkyl. In one embodiment, $R^5$ is a $(C_1-C_{16})$ alkyl. In one embodiment, each $R^4$ group is the same or different, and each is independently a $C_1-C_5$ alkyl, and $R^5$ is $C_1-C_5$ alkyl.

The solution polymerized styrene-butadiene rubber has a glass transition temperature in a range from −85° C. to −50° C. A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute, for example according to ASTM D7426 or equivalent.

Suitable styrene-butadiene rubbers functionalized with an alkoxysilane group and a thiol group are available commercially, such as Sprintan SLR 3402 from Trinseo.

Another component of the rubber composition is from about 0 to about 40 phr, alternatively from 10 to 30 phr, of natural rubber or synthetic polyisoprene. In one embodiment, the rubber composition comprises from 15 to 25 phr of natural rubber or synthetic polyisoprene. In one embodiment, the rubber composition comprises from 5 to 15 phr of natural rubber or synthetic polyisoprene.

Another component of the rubber composition is from about 0 to about 30 phr, alternatively from 0 to 20 phr, of cis-1,4 polybutadiene.

The rubber composition may include 0 to 50 phr, alternatively 1 to 30 phr, alternatively 1 to 10 phr, alternative 1 to 5 phr, of a processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, and low PCA oils, such as MES, TDAE, and heavy naphthenic oils, vegetable oils such as sunflower, soybean, and safflower oils, and monoesters of fatty acids selected from the group consisting of alkyl oleates, alkyl stearates, alkyl linoleates, and alkyl palmitates.

Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

Suitable TDAE oils are available as Tudalen SX500 from Klaus Dahleke KG, VivaTec 400 and VivaTec 500 from H&R Group, and Enerthene 1849 from BP, and Extensoil 1996 from Repsol. The oils may be available as the oil alone or along with an elastomer in the form of an extended elastomer.

Suitable vegetable oils include, for example, soybean oil, sunflower oil and canola oil which are in the form of esters containing a certain degree of unsaturation.

The rubber composition includes from 20 to 80 phr, alternatively 55 to 80 phr of a hydrocarbon resin having a Tg greater than 30° C.

Representative hydrocarbon resins include coumarone-indene-resins, petroleum resins, C5, C9, C5/C9 resins, DCPD and modified DCPD resins, terpene resins, alphamethyl styrene resins and mixtures and/or modification and/or hydrogenation thereof.

Coumarone-indene resins are commercially available in many forms with melting points ranging from 10 to 160° C. (as measured by the ball-and-ring method). Preferably, the melting point ranges from 30 to 100° C. Coumarone-indene resins are well known. Various analysis indicate that such resins are largely polyindene; however, typically contain random polymeric units derived from methyl indene, coumarone, methyl coumarone, styrene and methyl styrene.

Petroleum resins are commercially available with softening points ranging from 10° C. to 120° C. Preferably, the softening point ranges from 30 to 100° C. Suitable petroleum resins include both aromatic and nonaromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include dicyclopentadiene, cyclopentadiene, their dimers and diolefins such as isoprene and piperylene. Copolymers of these monomer with one another or with aromatic such as styrene and alphamethyl styrene are also included.

In one embodiment the resin is an aromatic modified polydicyclopentadiene.

Terpene resins are commercially produced from polymerizing a mixture of alpha, beta or any pinene isomere and modification thereof. The resin is usually supplied in a variety of melting points ranging from 10° C. to 135° C.

In one embodiment, the resin is derived from styrene and alphamethylstyrene. It is considered that, in one aspect, its glass transition temperature (Tg) characteristic combined with its molecular weight (Mn) and molecular weight distribution (Mw/Mn) provides a suitable compatibility of the resin in the rubber composition, the degree of compatibility being directly related to the nature of the rubber composition.

The presence of the styrene/alphamethylstyrene resin with a rubber blend which contains the presence of the styrene-butadiene elastomer is considered herein to be beneficial because of observed viscoelastic properties of the tread rubber composition such as complex and storage modulus, loss modulus tan·delta and loss compliance at different temperature/frequency/strain as hereinafter generally described.

The properties of complex and storage modulus, loss modulus, tan·delta and loss compliance are understood to be generally well known to those having skill in such art. They are hereinafter generally described.

The molecular weight distribution of the resin is visualized as a ratio of the resin's molecular weight average (Mw) to molecular weight number average (Mn) values and is considered herein to be in a range of about 1.5/1 to about 2.5/1 which is considered to be a relatively narrow range. This believed to be advantageous because of the selective compatibility with the polymer matrix and because of a contemplated use of the tire in wet and dry conditions over a wide temperature range.

The glass transition temperature Tg of the copolymer resin is considered herein to be in a range of about 20° C. to about 100° C., alternatively about 30° C. to about 80° C., depending somewhat upon an intended use of the prepared tire and the nature of the polymer blend for the tire tread. A suitable measurement of TG for resins is DSC according to ASTM D6604 or equivalent.

The styrene/alphamethylstyrene resin is considered herein to be a relatively short chain copolymer of styrene and alphamethylstyrene with a styrene/alphamethylstyrene molar ratio in a range of about 0.40 to about 1.50. In one aspect, such a resin can be suitably prepared, for example, by cationic copolymerization of styrene and alphamethylstyrene in a hydrocarbon solvent.

Thus, the contemplated styrene/alphamethylstyrene resin can be characterized, for example, by its chemical structure, namely, its styrene and alphamethylstyrene contents and softening point and also, if desired, by its glass transition temperature, molecular weight and molecular weight distribution.

In one embodiment, the styrene/alphamethylstyrene resin is composed of about 40 to about 70 percent units derived from styrene and, correspondingly, about 60 to about 30 percent units derived from alphamethylstyrene. In one embodiment, the styrene/alphamethylstyrene resin has a softening point according to ASTM No. E-28 in a range of about 80° C. to about 145° C.

Suitable styrene/alphamethylstyrene resin is available commercially as Resin 2336 from Eastman or Sylvares SA85 from Arizona Chemical.

In one embodiment, the resin is a C5/C9 hydrocarbon resin comprising C5 and C9 hydrocarbon fractions, wherein the resin has a glass transition temperature greater than 30° C. A suitable measurement of Tg for resins is DSC according to ASTM D6604 or equivalent. The hydrocarbon resin has a softening point between 0° C. and 160° C. as determined by ASTM E28 which might sometimes be referred to as a ring and ball softening point.

Suitable C5/C9 resins may include both aromatic and nonaromatic components. Differences in the C5/C9 resins are largely due to the olefins in the feedstock from which the hydrocarbon components are derived. The C5/C9 resin may contain "aliphatic" hydrocarbon components which have a hydrocarbon chain formed from C4-C6 fractions containing variable quantities of piperylene, isoprene, mono-olefins, and non-polymerizable paraffinic compounds. Such C5/C9 resins are based on pentene, butane, isoprene, piperylene, and contain reduced quantities of cyclopentadiene or dicyclopentadiene. The C5/C9 resin may also contain "aromatic" hydrocarbon structures having polymeric chains which are formed of aromatic units, such as styrene, xylene, .alpha.-methylstyrene, vinyl toluene, and indene.

In accordance with the present invention, the C5/C9 resin used in rubber compounding includes olefins such as piperylene, isoprene, amylenes, and cyclic components. The C5/C9 resin may also contain aromatic olefins such as styrenic components and indenic components.

Piperylenes are generally a distillate cut or synthetic mixture of C5 diolefins, which include, but are not limited to, cis-1,3-pentadiene, trans-1,3-pentadiene, and mixed 1,3-pentadiene. In general, piperylenes do not include branched C5 diolefins such as isoprene. In one embodiment, the C5/C9 resin has from 40 to 90% (by weight) piperylene, or from 50 to 90%, or more preferably from 60 to 90%. In a particularly preferred embodiment, the C5/C9 resin has from 70 to 90% piperylene.

In one embodiment, the C5/C9 resin is substantially free of isoprene. In another embodiment, the C5/C9 resin contains up to 15% isoprene, or less than 10% isoprene. In yet another embodiment, the C5/C9 resin contains less than 5% isoprene.

In one embodiment, the C5/C9 resin is substantially free of amylene. In another embodiment, the C5/C9 resin contains up to 40% amylene, or less than 30% amylene, or less than 25% amylene. In yet another embodiment, the C5/C9 resin contains up to 10% amylene.

Cyclics are generally a distillate cut or synthetic mixture of C5 and C6 cyclic olefins, diolefins, and dimers therefrom. Cyclics include, but are not limited to, cyclopentene, cyclopentadiene, dicyclopentadiene, cyclohexene, 1,3-cyclohexadiene, and 1,4-cyclohexadiene. A preferred cyclic is cyclopentadiene. The dicyclopentadiene may be in either the endo or exo form. The cyclics may or may not be substituted. Preferred substituted cyclics include cyclopentadienes and dicyclopentadienes substituted with a C1 to C40 linear, branched, or cyclic alkyl group, preferably one or more methyl groups. In one embodiment the C5/C9 resin may include up to 60% cyclics or up to 50% cyclics. Typical lower limits include at least about 0.1% or at least about 0.5% or from about 1.0% cyclics are included. In at least one embodiment, the C5/C9 resin may include up to 20% cyclics or more preferably up to 30% cyclics. In a particularly preferred embodiment, the C5/C9 resin comprises from about 1.0 to about 15% cyclics, or from about 5 to about 15% cyclics.

Preferred aromatics that may be in the C5/C9 resin include one or more of styrene, indene, derivatives of styrene, and derivatives of indene. Particularly preferred aromatic olefins include styrene, alpha-methylstyrene, beta-methylstyrene, indene, and methylindenes, and vinyl toluenes. The aromatic olefins are typically present in the C5/C9 resin from 5 to 45%, or more preferably from 5 to 30%. In particularly preferred embodiments, the C5/C9 resin comprises from 10 to 20% aromatic olefins.

Styrenic components include styrene, derivatives of styrene, and substituted styrenes. In general, styrenic components do not include fused-rings, such as indenics. In one embodiment, the C5/C9 resin comprises up to 60% styrenic components or up to 50% styrenic components. In one embodiment, the C5/C9 resin comprises from 5 to 30% styrenic components, or from 5 to 20% styrenic components. In a preferred embodiment, the C5/C9 resin comprises from 10 to 15% styrenic components.

The C5/C9 resin may comprise less than 15% indenic components, or less than 10% indenic components. Indenic components include indene and derivatives of indene. In one embodiment, the C5/C9 resin comprises less than 5% indenic components. In another embodiment, the C5/C9 resin is substantially free of indenic components.

Preferred C5/C9 resins have melt viscosity of from 300 to 800 centipoise (cPs) at 160 C, or more preferably of from 350 to 650 cPs at 160 C. In a particularly preferred embodiment, the C5/C9 resin's melt viscosity is from 375 to 615 cPs at 160 C, or from 475 to 600 cPs at 160 C. The melt viscosity may be measured by a Brookfield viscometer with a type "J" spindle, ASTM D6267.

Generally, C5/C9 resins have a weight average molecular weight (Mw) greater than about 600 g/mole or greater than about 1000 g/mole. In at least one embodiment, C5/C9 resins have a weight average molecular weight (Mw) of from 1650 to 1950 g/mole, or from 1700 to 1900 g/mole. Preferably C5/C9 resins have a weight average molecular weight of from 1725 to 1890 g/mole. The C5/C9 resin may have a number average molecular weight (Mn) of from 450 to 700 g/mole, or from 500 to 675 g/mole, or more preferably from 520 to 650 g/mole. The C5/C9 resin may have a z-average molecular weight (Mz) of from 5850 to 8150 g/mole, or more preferably from 6000 to 8000 g/mole. Mw, Mn, and Mz may be determined by gel permeation chromatography (GPC).

In one embodiment the C5/C9 resin has a polydispersion index ("PDI", PDI=Mw/Mn) of 4 or less. In a particularly preferred embodiment the C5/C9 resin has a PDI of from 2.6 to 3.1.

Preferred C5/C9 resins have a glass transition temperature (Tg) of from about −30 C to about 100 C, or from about 0 C. to 80 C, or from about 40-60 C, or from 45-55 C, or more preferably of from 48-53.degree. C. Differential scanning calorimetry (DSC) may be used to determine the C5/C9 resin's Tg.

In another embodiment the C5/C9 resin may be hydrogenated.

In one embodiment, the C5/C9 resin comprises 50-90% (by weight) piperylene, 0-5% isoprene, 10-30% amylenes, 0-5% cyclics, 0-10% styrenics, and 0-10% indenics.

In one embodiment, the C5/C9 resin comprises 50-90% (by weight) piperylene, 0-5% isoprene, 10-30% amylenes, 2-5% cyclics, 4-10% styrenics, and 4-10% indenics.

In one embodiment, the C5/C9 comprises about 60% (by weight) piperylene, about 22% amylene, about 3% cyclics, about 6% styrene, and about 6% indene, and further has a melt viscosity at 160 C of 436 cPs; Mn of 855 g/mole; Mw of 1595 g/mole; Mz of 3713 g/mole; PDI of 1.9; and Tg of 47 C.

The C5/C9 resin or DCPD/C9 resin may further be characterized by its aromatic hydrogen content, as determined by 1H NMR. In one embodiment, the C5/C9 resin has an aromatic hydrogen content less than 25 mole percent. In one embodiment, the C5/C9 resin has an aromatic hydrogen content is between 3 and 15 mole percent.

An example of a useful hydrocarbon polymer additive is the Oppera series of polymeric additives commercially available from ExxonMobil Chemical Company, including but not limited to Oppera 373.

In one embodiment, the resin is a DCPD-based resin which may include substituted or unsubstituted units derived from cyclopentadiene homopolymer or copolymer resins (referred to as CPD), dicyclopentadiene homopolymer or copolymer resins (referred to as DCPD or (D)CPD), terpene homopolymer or copolymer resins, pinene homopolymer or copolymer resins, C5 fraction homopolymer or copolymer resins, C9 fraction homopolymer or copolymer resins, alpha-methylstyrene homopolymer or copolymer resins, and combinations thereof. The DCPD-based resin may further include units derived from (D)CPD/vinylaromatic copolymer resins, (D)CPD/terpene copolymer resins, terpene/phenol copolymer resins, (D)CPD/pinene copolymer resins, pinene/phenol copolymer resins, (D)CPD/C5 fraction copolymer resins, (D)CPD/C9 fraction copolymer resins, terpene/vinylaromatic copolymer resins, terpene/phenol copolymer resins, pinene/vinylaromatic copolymer resins, pinene/phenol resins, C5 fraction/vinylaromatic copolymer resins, and combinations thereof. The phrase "units derived from dicyclopentadiene" includes units derived from substituted DCPD such as methyl DCPD or dimethyl DCPD.

Preferably, the DCPD-based resin comprises up to 100 mol % units derived from dicyclopentadiene, more preferably within the range from about 5 to about 90 mol % units derived from DCPD, most preferably from about 5 to about 70 mol % units derived from DCPD. Preferably, the DCPD-based resin comprises up to about 15% piperylene components, up to about 15% isoprene components, up to about 15% amylene components, up to about 20% indene components, within the range from about 60% to about 100% cyclic components, and up to about 20% styrenic components by weight of the monomers in the monomer mix.

While reference is made to a DCPD polymer, any polymer comprised of cyclic units mentioned herein is suitable for the present invention.

Cyclic components are generally a distillate cut or synthetic mixture of C5 and C6 to C15 cyclic olefins, diolefins, and dimers, co-dimers and trimers, etc., from a distillate cut. Cyclics include, but are not limited to, cyclopentene, cyclopentadiene, DCPD, cyclohexene, 1,3-cycylohexadiene, and 1,4-cyclohexadiene. A preferred cyclic is cyclopentadiene. The DCPD may be in either the endo or exo form. The cyclics may or may not be substituted. Preferred substituted cyclics include cyclopentadienes and DCPD substituted with a C1 to C40 linear, branched, or cyclic alkyl group, preferably one or more methyl groups. Preferably, the cyclic components are selected from the group consisting of: cyclopentadiene, cyclopentadiene dimer, cyclopentadiene trimer, cyclopentadiene-05 co-dimer, cyclopentadiene-piperylene co-dimer, cyclopentadiene-C4 co-dimer, cyclopentadiene-methyl cyclopentadiene co-dimer, methyl cyclopentadiene, methyl cyclopentadiene dimer, and mixtures thereof.

In some embodiments, the DCPD-based resin is substantially free of piperlyene. In other embodiments, the DCPD-based resin contains up to about 15 wt % piperlyene, or preferably about 5 to about 10 wt % piperlyene. In some embodiments, the DCPD-based resin is substantially free of amylene. In other embodiments, the DCPD-based resin contains up to about 15 wt % amylene, or preferably about 5 to about 10 wt % amylene. In some embodiments, the DCPD-based resin is substantially free of isoprene. In other embodiments, the DCPD-based resin contains up to about 15 wt % isoprene, or preferably about 5 to about 10 wt % isoprene. In some embodiments, the DCPD-based resin is substantially free of styrene. In other embodiments, the DCPD-based resin contains up to about 20 wt % styrene, or preferably about 5 to about 15 wt % styrene. In some embodiments, the DCPD-based resin is substantially free of indene. In other embodiments, the DCPD-based resin contains up to about 20 wt % indene, or preferably about 5 to about 15 wt % indene. In one embodiment the DCPD-based resin may include up to about 60 wt % cyclics or up to about 50 wt % cyclics. In some embodiments, the DCPD-based resin includes cyclics in an amount in the range of about 0.1 wt % to about 50 wt %, or about 0.5 wt % to about 30 wt % cyclics, or about 1.0 wt % to about 20 wt % cyclics are included. In other embodiments, the DCPD-based resin comprises from about 5 wt % to about 15 wt % cyclics.

Preferably, the DCPD-based resin has a refractive index greater than 1.5. Preferably, the DCPD-based resin has a softening point of about 80° C. or more (Ring and Ball, as measured by ASTM E-28) preferably from about 80° C. to about 150° C., preferably about 90° C. to about 120° C., preferably about 100 to about 120° C., preferably about 102° C. Preferably, the DCPD-based resin has a glass transition temperature (Tg) (as measured by ASTM E 1356 using a TA Instruments model 2920 machine) of from about −30° C. to about 100° C., preferably about 0° C. to about 80° C., preferably about 50° C. to about 70° C., preferably 55° C. Preferably, the DCPD-based resin comprises olefinic unsaturation, e.g., at least 1 mol % olefinic hydrogen, based on the total moles of hydrogen in the interpolymer as determined by 1H-NMR. Alternatively, the DCPD-based resin comprises from 1 to 20 mol % aromatic hydrogen, preferably from 2 to 15 mol % aromatic hydrogen, more preferably from 2 to 10 mol % aromatic hydrogen, preferably 9 mol % aromatic hydrogen, based on the total moles of hydrogen in the polymer. In other embodiments, the DCPD-based resins have a weight average molecular weight (Mw) greater than about 600 g/mole. In at least one embodiment, DCPD-based resins have a Mw in the range of about 600 to about 1000 g/mole, preferably about 700 to about 900 g/mole, preferably about 800 g/mole. The DCPD-based resin may have a number average molecular weight (Mn) in the range of about 300 to about 700 g/mole, preferably about 400 to about 600 g/mole, preferably about 500 g/mole. In one embodiment the DCPD-based resin has a polydispersion index ("PDI", PDI=Mw/Mn) of about 4 or less, preferably the DCPD-based resin has a PDI in the range of about 1.4 to about 1.8.

In one embodiment, the DCPD-based resin may be prepared by thermal polymerization. For example, the resin may be thermally polymerized from a feed containing cyclopentadiene in a benzene or toluene solvent for 2.0 to 4.0 hours at 220° C. to 280° C. and about 14 bars pressure (1.4 MPa), with conditions being adjusted to control the molecular weight and softening point of the resin. The feed may further contain alkyl cyclopentadienes, dimers and codimers of cyclopentadiene and methylcyclopentadiene, and other acyclic dienes such as 1,3-piperylene and isoprene. Other copolymerizable unsaturated monomers such as vinyl aromatics such as styrene, a-methylstyrene, indene, and vinyl toluene may also be present.

A suitable DCPD-based resin for use in the present invention is Oppera™ 383 resin, commercially available from ExxonMobil Chemical Company. Oppera™ 383 is an aromatic modified, cycloaliphatic hydrogenated hydrocarbon resin, having a softening point of about 102.5° C., a Mw of about 800 g/mole and a Mn of about 500 g/mole, a Tg of about 55° C., and an aromaticity of about 9.8% aromatic protons.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 90 to about 150 phr of silica.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, 315 etc.; silicas available from Rhodia, with, for example, designations of Z1165MP and Z165GR and silicas available from Degussa AG with, for example, designations VN2 and VN3, etc.

Pre-hydrophobated precipitated silica may be used. By pre-hydrophobated, it is meant that the silica is pretreated, i.e., the pre-hydrophobated precipitated silica is hydrophobated prior to its addition to the rubber composition by treatment with at least one silane. Suitable silanes include but are not limited to alkylsilanes, alkoxysilanes, organoalkoxysilyl polysulfides and organomercaptoalkoxysilanes. Alternatively, the precipitated silica may be pre-treated with a silica coupling agent comprised of, for example, an alkoxyorganomercaptosilane or combination of alkoxysilane and alkoxyorganomercaptosilane prior to blending the pre-treated silica with the rubber instead of reacting the precipitated silica with the silica coupling agent in situ within the rubber. For example, see U.S. Pat. No. 7,214,731. For various pre-treated precipitated silicas see, for example, U.S. Pat. Nos. 4,704,414, 6,123,762 and 6,573,324. Suitable pre-treated or pre-hydrophobated silica is available commercially for example as Agilon 400 from PPG.

The vulcanizable rubber composition may include from about 1 to about 20 phr, alternatively 1 to 5 phr, of carbon black.

Commonly employed carbon blacks can be used as a conventional filler. Representative examples of such carbon blacks include N110, N121, N134, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

It may be preferred to have the rubber composition for use in the tire component to additionally contain a conventional sulfur containing organosilicon compound. Examples of suitable sulfur containing organosilicon compounds are of the formula:

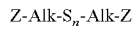

Z-Alk-S$_n$-Alk-Z          V in which Z is selected from the group consisting of

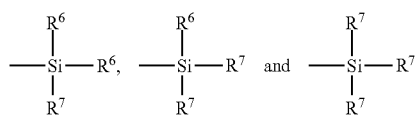

where R$^6$ is an alkyl group of 1 to 4 carbon atoms, cyclohexyl or phenyl; R$^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxydiethoxysilylethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxysilylpropyl) sulfides. The most preferred compounds are 3,3'-bis(triethoxysilylpropyl) disulfide and 3,3'-bis(triethoxysilylpropyl) tetrasulfide. Therefore, as to formula V, preferably Z is

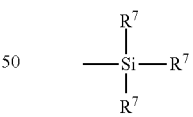

where R$^7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, CH$_3$(CH$_2$)$_6$C(=O)-S—CH$_2$CH$_2$CH$_2$Si(OCH$_2$CH$_3$)$_3$, which is available commercially as NXT™ from Momentive Performance Materials.

In one embodiment, the sulfur containing organosilicon compounds include the reaction product of hydrocarbon based diol (e.g., 2-methyl-1,3-propanediol) with S-[3-(triethoxysilyl)propyl] thiooctanoate. In one embodiment, the sulfur containing organosilicon compound is NXT-Z™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1 to 6 phr being preferred. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), pages 344 through 346. Typical amounts of antiozonants comprise about 1 to 5 phr. Typical amounts of fatty acids, if used, which can include stearic acid comprise about 0.5 to about 5 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 2.0, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a tread of a tire.

The pneumatic tire of the present invention may be a race tire, passenger tire, aircraft tire, agricultural, earthmover, off-the-road, truck tire, and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

Alternatively, the rubber composition may be used in the form of a component of shoes, shoe soles, transmission belts, hoses, vibration dampers, airsprings, conveyor belts, and track belts.

The following examples are presented for the purposes of illustrating and not limiting the present invention. All parts are parts by weight unless specifically identified otherwise.

Example 1

In this example, three rubber compounds are compared. Sample 1 represents a control sample. Samples 2 and 3 are representative of the present invention.

The elastomers were compounded in a multi-stage mix procedure with standard amounts of conventional curatives and processing aids as indicated in Table 1 (all amounts in phr), and cured with a standard cure cycle. Tires having tread made from compounds of samples 1-3 were tested for various performance criteria as shown in Table 2 (values normalized to the control=100, higher is better)

TABLE 1

| Type | Sample No. | | |
|---|---|---|---|
| | 1 Control | 2 Invention | 3 Invention |
| Styrene-Butadiene 1[1] | 50 | 0 | 0 |
| Styrene-Butadiene 2[2] | 40 | 0 | 0 |
| Styrene-Butadiene 3[2] | 0 | 80 | 80 |
| Polybutadiene[4] | 10 | 0 | 0 |
| Natural Rubber | 0 | 20 | 20 |
| Silica | 106 | 135 | 125 |
| Silane Coupler 1[5] | 10 | 0 | 12.5 |
| Silane Coupler 2[6] | 0 | 13.5 | 0 |
| Oil | 40 | 4 | 4 |
| Resin 1[7] | 12 | 0 | 0 |
| Resin 2[8] | 0 | 57 | 0 |
| Resin 3[9] | 0 | 0 | 62 |

[1] SE SLR6430 SSBR, 40% styrene, 14% vinyl, Tg (OE) = −34° C., 37.5 phr TDAE oil, from Trinseo
[2] TUFDENE E680 SSBR, 34% styrene, 38% vinyl, Tg(OE) = −25° C., 37.5 phr SRAE oil, from Asahi Chemical
[3] Solution polymerized SBR with styrene content of 15% and 1,2-vinyl content of 30%, Tg = −60° C. obtained from Trinseo as SLR3402.
[4] High cis polybutadiene, obtained as Budene 1223 from The Goodyear Tire & Rubber Company.
[5] TESPD type silane coupling agent
[6] 3-(octanoylthio)-1-propyltriethoxysilane as NXT from Momentive
[7] Copolymer of styrene and alpha-methylstyrene, Tg = +39° C., with an aromatic hydrogen content of about 53 mole % obtained as Sylvatraxx4401 from Arizona Chemical.
[8] Oppera ™ 383, aromatic modified, cycloaliphatic hydrocarbon resin, having a softening point of about 102.5° C., a Mw of about 800 g/mole and a Mn of about 500 g/mole, a Tg of about 55° C., and an aromaticity of about 9.8% aromatic protons, from ExxonMobil
[9] Oppera ™ 373

TABLE 2

| | | | |
|---|---|---|---|
| Rolling Resistance Index | 100 | 110 | 99 |
| Wet Braking Index | 100 | 105 | 102 |
| Treadwear Index | 100 | 135 | 140 |

Example 2

In this example, two rubber compounds are compared. Sample 4 represents a control sample. Sample 5 is representative of the present invention.

The elastomers were compounded in a multi-stage mix procedure with standard amounts of conventional curatives and processing aids as indicated in Table 3 (all amounts in phr), and cured with a standard cure cycle. Tires having tread made from compounds of samples 4-5 were tested for various performance criteria as shown in Table 4 (values normalized to the control=100, higher is better)

TABLE 3

| Type | Sample No. | |
|---|---|---|
| | 4 Control | 5 Invention |
| Styrene-Butadiene 1[1] | 100 | 0 |
| Styrene-Butadiene 2[2] | 0 | 100 |
| Silica | 135 | 135 |
| Silane Coupler[3] | 13.5 | 13.5 |
| TDAE Oil | 53 | 4 |
| Resin[4] | 4 | 65 |

[1] Solution polymerized SBR with styrene content of 21% and 1,2-vinyl content of 50%, Tg = −23° C., functionalized with alkoxysilane and thiol groups, obtained from Trinseo as SLR4602.
[2] Solution polymerized SBR with styrene content of 15% and 1,2-vinyl content of 30%, Tg = −60° C., functionalized with alkoxysilane and thiol groups, obtained from Trinseo as SLR3402.
[3] 3-(octanoylthio)-1-propyltriethoxysilane as NXT from Momentive
[4] Oppera ™ 383, aromatic modified, cycloaliphatic hydrocarbon resin, having a softening point of about 102.5° C., a Mw of about 800 g/mole and a Mn of about 500 g/mole, a Tg of about 55° C., and an aromaticity of about 9.8% aromatic protons, from ExxonMobil

TABLE 4

| | | |
|---|---|---|
| Rolling Resistance Index | 100 | 100 |
| Wet Braking Index | 100 | 100 |
| Treadwear Index | 100 | 182 |
| Chinning & Flaking | | |
| Tensile Strength rating, S2 23 C. | 100 | 160 |
| Elongation at Break rating, S2, 23 C. | 100 | 187 |

While certain representative embodiments and details have been shown for the purpose of illustrating the subject invention, it will be apparent to those skilled in this art that various changes and modifications can be made therein without departing from the scope of the subject invention.

The invention claimed is:

1. A pneumatic tire having a tread comprising a vulcanizable rubber composition comprising, based on 100 parts by weight of elastomer (phr),
   (A) 100 phr of a solution polymerized styrene-butadiene rubber having a glass transition temperature (Tg) ranging from −85° C. to −50° C.;
   (B) from 1 to 30 phr of a process oil;
   (C) from 20 to 80 phr of a hydrocarbon resin having a Tg of at least 30° C.; and
   (D) from 90 to 150 phr of silica.

2. The pneumatic tire of claim 1, wherein the amount of process oil ranges from 1 to 10 phr.

3. The pneumatic tire of claim 1, wherein the hydrocarbon resin is selected from the group consisting of styrene/alphamethylstyrene copolymer resins, C5/C9 copolymer resins, dicyclopentadiene resins, and aromatic dicyclopentadiene resins and combinations thereof.

4. The pneumatic tire of claim 1, wherein the resin is an aromatic modified dicyclopentadiene resin.

5. The pneumatic tire of claim 1, wherein the resin is a styrene/alphamethylstyrene copolymer resins.

6. The pneumatic tire of claim 1, wherein the resin is a DCPD-based resin comprising from about 5 to about 90 mol % units derived from DCPD.

7. The pneumatic tire of claim 1, wherein the resin is a DCPD-based resin comprising from 1 to 20 mol % aromatic hydrogen.

8. The pneumatic tire of claim 1, wherein the resin is a C5/C9 resin comprising 50-90% (by weight) piperylenes, 0-5% isoprene, 10-30% amylenes, 2-5% cyclics, 4-10% styrenics, and 4-10% indenics.

9. The pneumatic tire of claim 1, wherein the resin is a C5/C9 resin comprising an aromatic hydrogen content between 3 and 15 mole percent.

10. The pneumatic tire of claim 1, wherein the solution polymerized styrene-butadiene rubber is functionalized with an alkoxysilane group and at least one functional group selected from the group consisting of primary amines and thiols.

11. The pneumatic tire of claim 1, wherein the oil is selected from the group consisting of aromatic, paraffinic, naphthenic, MES, TDAE, heavy naphthenic oils, and vegetable oils.

12. The pneumatic tire of claim 1, wherein the solution polymerized styrene-butadiene rubber functionalized with an alkoxysilane group and a primary amine group, and is represented by the formula (1) or (2)

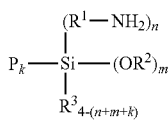
(1)

wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

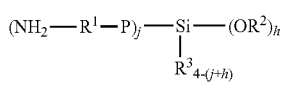
(2)

wherein P, $R^1$, $R^2$ and $R^3$ have the same definitions as give for the above-mentioned formula (1), j is an integer of 1 to 3, and h is an integer of 1 to 3, with the provision that j+h is an integer of 2 to 4.

13. The pneumatic tire of claim 1, wherein the solution polymerized styrene-butadiene rubber is functionalized with an alkoxysilane group and a primary amine group comprises the reaction product of a living polymer chain and a terminating agent of the formula

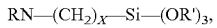

wherein R in combination with the nitrogen (N) atom is a protected amine group which upon appropriate post-treatment yields a primary amine, R' represents a group having 1 to 18 carbon atoms selected from an alkyl, a cycloalkyl, an allyl, or an aryl; and X is an integer from 1 to 20.

14. The pneumatic tire of claim 1 wherein the solution polymerized styrene-butadiene rubber is functionalized with an alkoxysilane group and a thiol, and comprises the reaction product of a living anionic polymer and a silane-sulfide modifier represented by the formula

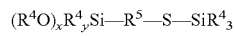

wherein Si is silicon; S is sulfur; O is oxygen; x is an integer selected from 1, 2 and 3; y is an integer selected from 0, 1, and 2; x+y=3; $R^4$ is the same or different and is ($C_1$-$C_{16}$) alkyl; and $R^5$ is aryl, and alkyl aryl, or ($C_1$-$C_{16}$) alkyl.

15. A vulcanizable rubber composition comprising
(A) 100 phr of a solution polymerized styrene-butadiene rubber having a glass transition temperature (Tg) ranging from −85° C. to −50° C.;
(D) from 1 to 30 phr of a process oil;
(E) from 55 to 80 phr of a hydrocarbon resin having a Tg of at least 30° C.; and
(F) from 90 to 150 phr of silica.

16. The vulcanizable rubber composition of claim 15, wherein the amount of process oil ranges from 1 to 10 phr.

17. The vulcanizable rubber composition of claim 15, in the form of a component of product selected from the group consisting of shoes, shoe soles, transmission belts, hoses, vibration dampers, airsprings, conveyor belts, and track belts.

* * * * *